United States Patent [19]

Müller

[11] Patent Number: 5,706,158
[45] Date of Patent: Jan. 6, 1998

[54] METHOD FOR SHORT-CIRCUIT CURRENT LIMITING ON AN ELECTRICAL POWER TRANSMISSION LINE AND CONFIGURATION FOR SHORT-CIRCUIT LIMITING

[75] Inventor: Walter Müller, Uffing, Germany

[73] Assignee: Siemens Aktiengesellschaft, Munich, Germany

[21] Appl. No.: 592,026

[22] Filed: Jan. 26, 1996

Related U.S. Application Data

[63] Continuation of PCT/DE94/00806, Jul. 13, 1994.

[30] Foreign Application Priority Data

Jul. 26, 1993 [DE] Germany ............... 43 25 061.0

[51] Int. Cl.[6] ............................................. H02H 3/18
[52] U.S. Cl. ................... 361/87; 361/62; 361/93; 361/115
[58] Field of Search ................... 361/87, 58, 115, 361/93, 107, 35, 62

[56] References Cited

U.S. PATENT DOCUMENTS 4,336,488  6/1982  Glavitsch ................... 323/215

FOREIGN PATENT DOCUMENTS

| 3005950 | 8/1981 | Germany | H02J 3/08 |
| 2753464 | 2/1984 | Germany | H01F 29/02 |
| 4323290 | 1/1995 | Germany | H02J 3/06 |

OTHER PUBLICATIONS

Brown Boveri Mitt, Aug. 1972, pp. 376–383, (Dobia) "Transformers for long–and short–circuits".

Elektrizitätswirtschaft [Electricity Economy] Year 86 (1987) Issue 4, pp. 123–128.

IEEE Spectrum, Apr. 1993, pp. 40–45, "Flexible ac transmission".

*Primary Examiner*—Jeffrey A. Gaffin
*Assistant Examiner*—Stephen Jackson
*Attorney, Agent, or Firm*—Herbert L. Lerner; Laurence A. Greenberg

[57] ABSTRACT

In order to obtain an improved operating behavior in the event of short circuits on a high-voltage line having a phase shifter, the phase shifter is used as a current limiter in the event of a fault. A fault signal, which results in an increase in an opposing voltage at an additional transformer of the phase shifter, is produced for this purpose, as a function of a fault current.

8 Claims, 1 Drawing Sheet

METHOD FOR SHORT-CIRCUIT CURRENT LIMITING ON AN ELECTRICAL POWER TRANSMISSION LINE AND CONFIGURATION FOR SHORT-CIRCUIT LIMITING

CROSS-REFERENCE TO RELATED APPLICATION

This application is a Continuation of International Application Serial No. PCT/DE94/00806, filed Jul. 13, 1994.

BACKGROUND OF THE INVENTION

Field of the Invention

The invention relates to a method and a configuration for short-circuit current limiting on an electrical transmission line in which one winding of a transformer is connected, in which a current on the transmission line is limited by the winding and in which the short-circuit current limiting at the transformer is activated by a control device.

In order to protect electrical power transmission lines in the event of short circuits, it is known for protective devices, for example a distance protective device or an overcurrent protective device, to be used at ends of the power transmission lines. If a short circuit occurs, then the faulty line is disconnected by power circuit breakers which are located at its ends. The power transmission is then completely interrupted. That is not absolutely essential, particularly in the case of grid networks.

It is known for a regulating configuration having a transformer set to be used for the coupling of electrical grids, such as in the publication entitled: Elektrizitätswirtschaft [Electricity Economy], Year 86 (1987), Issue 4, pages 123 to 128. Such a transformer set includes an additional transformer which is connected in the electrical transmission line and is supplied with power from an energizer transformer in order to produce an in-phase or quadrature-phase voltage on the line. Such a transformer set has the task of compensating for phase shifts between the grids, with it being possible to influence the power to be transmitted. It is therefore also called a phase shifter. In the event of a short circuit, a considerable short-circuit current flows through the additional transformer in such a configuration. That is undesirable.

If the regulating configuration is equipped with a semiconductor converter for driving the additional transformer, the dimensioning of semiconductor valves is governed by a maximum value of the network short-circuit current, which is influenced only by the selection of the short-circuit voltage of the additional transformer. Load-flux control becomes more effective, the smaller the short-circuit voltage of the additional transformer is chosen to be. One construction of a regulating configuration with semiconductors is known from IEEE SPECTRUM, April 1993, pages 40 to 45.

SUMMARY OF THE INVENTION

It is accordingly an object of the invention to provide a method and a configuration for short-circuit limiting on an electrical power transmission line, which overcome the hereinafore-mentioned disadvantages of the heretofore-known methods and devices of this general type and in which improved grid operation is possible.

With the foregoing and other objects in view there is provided, in accordance with the invention, a method for short-circuit current limiting on an electrical transmission line, which comprises connecting one winding of an additional transformer of a phase shifter to an electrical high-voltage transmission line for limiting a current on the high-voltage transmission line; activating short-circuit current limiting at the additional transformer with a control device by passing a fault signal from a protective device to the control device for activation of the short-circuit current limiting upon the occurrence of a short circuit on the high-voltage transmission line; and supplying power provided by an energizer transformer from the control device to the additional transformer, and producing an opposing voltage at the additional transformer on the high-voltage line in the sense of short-circuit current limiting with an in-phase, quadrature-phase or phase-shifted voltage.

In accordance with another mode of the invention, there is provided a method which comprises detecting at least one of a fault direction and a fault location of the short circuit with the protective device, encrypting at least one of the fault direction and the fault location of the short circuit in the fault signal, and producing a suitable opposing voltage as a function of the fault direction.

With the objects of the invention in view, there is also provided a method for phase-shifted, in-phase or quadrature-phase regulation for current limiting, which comprises connecting an additional transformer of a phase shifter to a high-voltage line; monitoring the high-voltage line for a short circuit with a protective device; producing a fault signal upon identification of a short-circuit current; and supplying the fault signal to a control device of the additional transformer for producing an opposing voltage at the additional transformer in the sense of current limiting.

With the objects of the invention in view, there is additionally provided a configuration for short-circuit current limiting on an electrical transmission line, comprising a protective device for detection of a short circuit on a high-voltage transmission line; and a phase shifter having a converter-controlled additional transformer with one winding being connected to the high-voltage transmission line for limiting a current on the high-voltage transmission line; an energizer transformer for phase-shifted, quadrature-phase or in-phase regulation of power on the high-voltage transmission line; and a control device connected between the energizer transformer and the additional transformer for activation of short-circuit current limiting; the control device receiving a fault signal upon detection of a short circuit by the protective device, and an opposing voltage being produced at the additional transformer in the sense of short-circuit current limiting with an in-phase, quadrature-phase and phase-shifted voltage.

In accordance with another feature of the invention, the protective device is a distance protective device or an overcurrent protective device.

In accordance with a further feature of the invention, the phase shifter has a converter including the control device, for supplying the additional transformer.

In accordance with a concomitant feature of the invention, the converter is a semiconductor converter having an intermediate circuit.

Although the requirements with respect to damage prevention are similar for protection of the line and for protection of the additional transformer, those two problems have until now always been dealt with separately.

The invention is based on the observation that converter-controlled phase shifters with a transformer set have a very favorable time response. A completely novel type of control has been developed which allows the phase shifter to be used virtually as a short-circuit current limiter between supply networks. In consequence, the configuration protects itself and, furthermore, other parts of the supply networks against effects of short-circuit currents. Since the additional transformer is used in the sense of a power circuit breaker in this way, the circuit complexity at the additional transformer, in high-voltage engineering terms, can also be kept low, if required. Specifically, there is no longer any need for any power circuit breakers to be provided for it. Isolating switches are sufficient. The interconnection of the supply networks in power terms is then carried out by controlling the converter at the additional transformer.

In this case, it is particularly advantageous that the power semiconductors, in particular the thyristors or GTO thyristors, can be utilized to a far greater extent, since the short-circuit current amplitude in the converter intermediate circuit can be limited to a lower value. It is then possible to operate with a reduced number of thyristors, with an intermediate-circuit voltage which is then appropriately matched.

Furthermore, the present solution is a step in the direction of integrated protective technology for power transmission, in which optimum protection is achieved by coupling of the individual components. The invention can also advantageously be used in the case of future power distribution grids in which superconduction will be used. Specifically, in the case of the present-day prior art, such applications are possible only by using the principle of controlled "quenching".

Other features which are considered as characteristic for the invention are set forth in the appended claims.

Although the invention is illustrated and described herein as embodied in a method for short-circuit current limiting on an electrical power transmission line and a configuration for short-circuit limiting, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
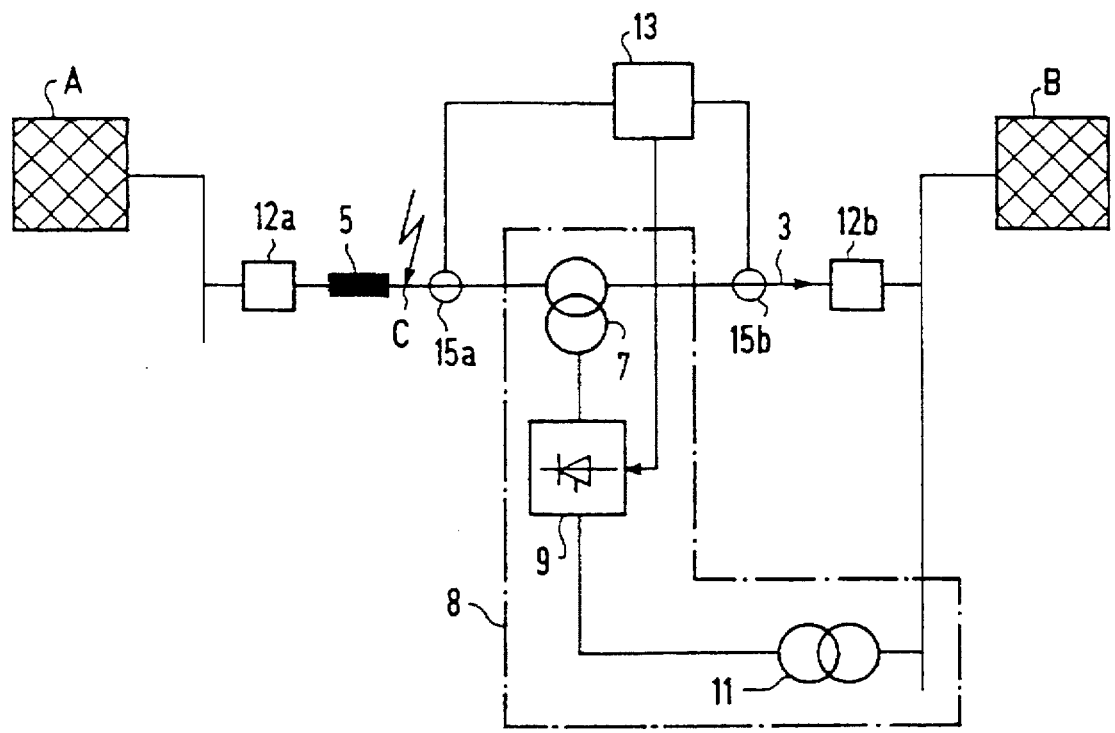
FIG. 1 is a schematic and block circuit diagram of a grid configuration having a phase shifter.

Referring now to the figures of the drawing in detail and first, particularly, to FIG. 1 thereof, there are seen two electrical supply networks A and B which are connected to one another through an electrical line 3, in particular a high-voltage line. An associated line inductance is designated by reference numeral 5. An additional transformer 7, which is used as a power section of a phase shifter 8, is connected in series in the line 3. The additional transformer 7 is controlled by a control device in the form of a converter 9 (having an intermediate circuit) with an associated energizer transformer 11. The converter 9 is constructed as an intermediate-circuit converter having semiconductor components, in particular having power semiconductor components, for example GTO thyristors.

If a short circuit takes place on the line 3 at a point C, then a not insignificant part of a short-circuit current flows from the supply network B through the additional transformer 7 into the short circuit. Under some circumstances, reliable initiation of grid protective devices 12a, 12b, which are disposed at the end of the line 3, is not ensured. The additional transformer 7 must carry the short-circuit current.

A fault detection device 13 is electrically assigned to the converter 9. The fault detection device 13 detects the location and/or the direction of the short circuit through suitable measuring sensors 15a, 15b, and emits an appropriate fault signal or command to a non-illustrated control device of the converter 9. If required, the direction can be included in encrypted form in the fault signal. The fault detection device 13 can also be part of the converter 9. The converter 9 then immediately limits (or cuts off) the power on the next zero crossing of the voltage at the additional transformer 7, as a result of which the power supply for the short circuit from the supply network B is immediately interrupted. If required, the information about the fault location and/or the direction of the short circuit can be made available by already existing protective devices on the line, for example by the existing grid protective devices 12a, 12b. The device 13 can then be omitted. Distance protection or overcurrent protection devices are used, for example, as the grid protective devices 12a, 12b.

Figure 2:
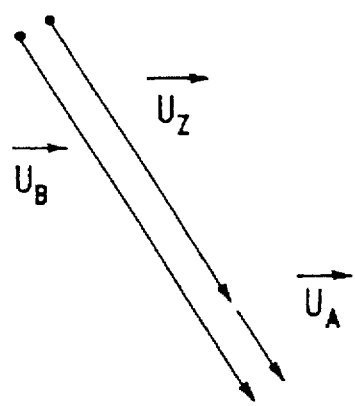
FIG. 2 is an associated voltage vector diagram.

FIG. 2 shows a single-pole voltage vector diagram for the case of a short circuit in the supply network A. In this case a voltage $U_A$ has been collapsed with respect to a voltage $U_B$ by the short circuit. An additional voltage $U_Z$ is fed in through the additional transformer 7, by the phase shifter 8.

Use of the phase shifter 8 as a short-circuit current limiter results in the direct advantage for the phase shifter 8, in particular for its converter 9 itself, of permitting the power semiconductor components which are constructed, for example, for a steady-state continuous current of $I_N=1$ kA in the case of a surge short-circuit current amplitude in the intermediate circuit of 25 kA, to be utilized to a far greater extent if the short-circuit current amplitude is limited, for example, to $2 \times I_N$. In this case, a continuous current of, for example, $I_N=3$ kA could then be acceptable. As a result thereof, it is now possible to operate with a third of the previously required number of thyristors, with an appropriately matched intermediate-circuit voltage, because of the series connection of the power semiconductors.

If a phase shifter for a high-voltage line already exists, then only detection of the short-circuit location and/or of the short-circuit current, and appropriate control matching in the converter of the phase shifter, are required for implementation of the indicated configuration. If the phase shifter is equipped with a computer, then this can be done simply by adaptation of the control software.

I claim:

1. A method for short-circuit current limiting on an electrical transmission line, which comprises:

connecting one winding of an additional transformer of a phase shifter to an electrical high-voltage transmission line for limiting a current on the high-voltage transmission line;

activating short-circuit current limiting at the additional transformer with a control device by passing a fault signal from a grid protective device to the control device for activation of the short-circuit current limiting upon the occurrence of a short circuit on the high-voltage transmission line; and supplying power provided by an energizer transformer from the control device to the additional transformer, and producing an opposing voltage at the additional transformer on the high-voltage line in the sense of short-circuit current limiting with an in-phase, quadrature-phase or phase-shifted voltage.

2. A method for short-circuit current limiting on an electrical transmission line, which comprises:

connecting one winding of an additional transformer of a phase shifter to an electrical high-voltage transmission line for limiting a current on the high-voltage transmission line;

detecting at least one of a fault direction and a fault location of a short circuit with a protective device, encrypting at least one of the fault direction and the fault location of the short circuit in a fault signal;

activating short-circuit current limiting at the additional transformer with a control device by passing the fault signal from the protective device to the control device for activation of the short-circuit current limiting upon the occurrence of the short circuit on the high-voltage transmission line; and supplying power provided by an energizer transformer from the control device to the additional transformer, and producing an opposing voltage at the additional transformer on the high-voltage line in the sense of short-circuit current limiting with an in-phase, quadrature-phase or phase-shifted voltage as a function of the fault direction.

3. A method for phase-shifted, in-phase or quadrature-phase regulation for current limiting, which comprises:

connecting an additional transformer of a phase shifter to a high-voltage line;

monitoring the high-voltage line for a short circuit with a grid protective device;

producing a fault signal upon identification of a short-circuit current; and supplying the fault signal to a control device of the additional transformer for producing an opposing voltage at the additional transformer in the sense of current limiting.

4. A configuration for short-circuit current limiting on an electrical transmission line, comprising:

a protective device for detection of a short circuit on a high-voltage transmission line; and a phase shifter having:

a converter-controlled additional transformer with one winding being connected to the high-voltage transmission line for limiting a current on the high-voltage transmission line;

an energizer transformer for phase-shifted, quadrature-phase or in-phase regulation of power on the high-voltage transmission line; and a control device connected between said energizer transformer and said additional transformer for activation of short-circuit current limiting;

said control device receiving a fault signal upon detection of a short circuit by said protective device, and an opposing voltage being produced at said additional transformer in the sense of short-circuit current limiting with an in-phase, quadrature-phase and phase-shifted voltage.

5. The configuration according to claim 4, wherein said protective device is a distance protective device.

6. The configuration according to claim 4, wherein said protective device is an overcurrent protective device.

7. The configuration according to claim 4, wherein said phase shifter has a converter including said control device, for supplying said additional transformer.

8. The configuration according to claim 7, wherein said converter is a semiconductor converter having an intermediate circuit.

\* \* \* \* \*